United States Patent
Koziar, Jr.

(10) Patent No.: US 12,035,704 B2
(45) Date of Patent: *Jul. 16, 2024

(54) WASH DOWN SENSOR FOR ELECTRONIC RODENT TRAPS AND METHOD OF PREVENTING FALSE TRIGGERING USING A WASH DOWN SENSOR

(71) Applicant: Woodstream Corporation, Lancaster, PA (US)

(72) Inventor: Peter Koziar, Jr., Lititz, PA (US)

(73) Assignee: Woodstream Corporation, Lancaster, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/073,894

(22) Filed: Dec. 2, 2022

(65) Prior Publication Data

US 2023/0098513 A1   Mar. 30, 2023

Related U.S. Application Data

(63) Continuation of application No. 16/456,450, filed on Jun. 28, 2019, now Pat. No. 11,528,900.

(60) Provisional application No. 62/694,801, filed on Jul. 6, 2018.

(51) Int. Cl.
*A01M 23/38* (2006.01)
*G01V 3/02* (2006.01)

(52) U.S. Cl.
CPC ............ *A01M 23/38* (2013.01); *G01V 3/02* (2013.01)

(58) Field of Classification Search
CPC ...... A01M 23/38; A01M 19/00; A01M 23/02; A01M 23/26; A01M 23/06; G01V 3/02; G01V 23/02; A10M 23/38; A10M 23/02; A10M 23/06

USPC ................................................ 43/98, 99, 89
See application file for complete search history.

(56) References Cited

U.S. PATENT DOCUMENTS

| | | |
|---|---|---|
| 5,592,774 A | 1/1997 | Galyon |
| 5,919,142 A | 7/1999 | Boone et al. |
| 5,949,636 A | 9/1999 | Johnson et al. |
| 6,735,899 B1 | 5/2004 | Anderson et al. |
| 6,836,999 B2 | 1/2005 | Rich et al. |

(Continued)

FOREIGN PATENT DOCUMENTS

| | | |
|---|---|---|
| CA | 2755772 A1 | 9/2010 |
| CN | 103907594 A | 7/2014 |

(Continued)

OTHER PUBLICATIONS

Extended European Search Report, Application No. 19831205.0-1004, Dated: Mar. 9, 2022; 11 pages.

(Continued)

*Primary Examiner* — Timothy D Collins
*Assistant Examiner* — Maria E Graber
(74) *Attorney, Agent, or Firm* — Barley Snyder

(57) ABSTRACT

A rodent monitoring or killing mechanism includes a housing body having a resistive sensor and a wash down sensor operatively coupled to the resistive sensor. The wash down sensor distinguishes between the presence of water within the housing body and the presence of a rodent according to at least one measurement of resistance from the resistive sensor. The at least one measurement of resistance is created by contact of the resistance sensor with the water or the rodent.

19 Claims, 7 Drawing Sheets

(56) References Cited

U.S. PATENT DOCUMENTS

| | | |
|---|---|---|
| 7,219,466 B2 | 5/2007 | Rich et al. |
| 8,026,822 B2 | 9/2011 | Borth et al. |
| 8,151,514 B2 | 4/2012 | bucher et al. |
| 11,528,900 B2 * | 12/2022 | Koziar, Jr. ............... G01V 3/02 |
| 2005/0044775 A1 | 3/2005 | Rich et al. |
| 2006/0123693 A1 * | 6/2006 | Muller .................. A01M 23/38 |
| 2007/0245617 A1 | 10/2007 | Deibert |
| 2009/0172995 A1 | 1/2009 | Wetzel et al. |
| 2009/0102600 A1 | 4/2009 | Noe et al. |
| 2009/0313880 A1 | 12/2009 | Bucher et al. |
| 2010/0134301 A1 | 6/2010 | Borth |
| 2010/0236132 A1 | 9/2010 | Rivera |
| 2012/0240450 A1 | 9/2012 | Weir et al. |
| 2017/0231213 A1 | 8/2017 | Gordon et al. |
| 2018/0249696 A1 | 9/2018 | Daly, Jr. et al. |

FOREIGN PATENT DOCUMENTS

| | | |
|---|---|---|
| CN | 106614448 A | 5/2017 |
| JP | 2014236736 A1 | 12/2014 |
| WO | 9533372 A1 | 12/1995 |
| WO | 2014024052 A1 | 2/2014 |
| WO | WO-2014024052 A1 * | 2/2014 |
| WO | 2017081432 A1 | 5/2017 |

OTHER PUBLICATIONS

Preliminary Office Action from the Brazilian Patent Office dated Apr. 18, 2023 with English translation, corresponding to Application No. BR112021000185-9, 4 pages.
Canadian Patent Office Action, Application No. 3,105,024, dated Dec. 15, 2023, 4 pages.

* cited by examiner

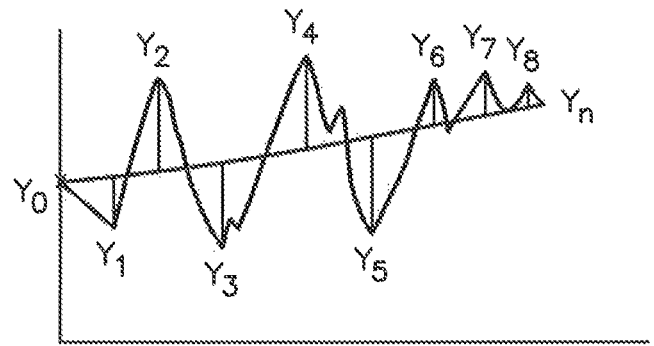
FIG. 8
$$I_{sigma} = \sqrt{\sum_{i=0}^{n}(Y_i - (Y_0 + \frac{delta * i}{n-1}))^2}$$
FIG. 9
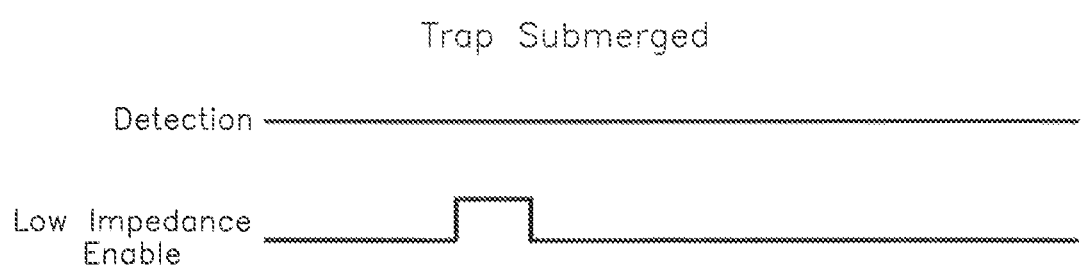
FIG. 10

WASH DOWN SENSOR FOR ELECTRONIC RODENT TRAPS AND METHOD OF PREVENTING FALSE TRIGGERING USING A WASH DOWN SENSOR

CROSS-REFERENCE TO RELATED APPLICATIONS

This application claims the benefit of the filing date under 35 U.S.C. § 119(a)-(d) of U.S. Non-provisional patent application Ser. No. 16/456,450, filed on Jun. 28, 2019, and U.S. Provisional Patent Application No. 62/694,801, filed on Jul. 6, 2018.

FIELD OF THE INVENTION

The present invention is related to the field of pest control and, more particularly, to a wash down sensor or low resistance sensing circuit for preventing false triggering of an electronic rodent trap when exposed to water and method of electronic trap operation using a wash down sensor.

BACKGROUND

Electronic rodent traps like those disclosed in U.S. Pat. No. 6,735,899 ("the '899 patent") and U.S. Pat. No. 7,219,466 ("the '466 patent") include a resistive sensor that is activated in response to a sufficient resistance being applied across the sensing elements, embodied as two or more electrically charged plates, to cause the voltage on the sensing mechanism to be pulled down. In response, the trap initiates a killing cycle in which a generator applies high voltage to the charged plates to dispatch the sensed rodent. The '899 and '466 patents are both assigned to the present assignee of this application and the disclosures of these two patents are hereby expressly incorporated by reference as if fully set forth herein in their entirety.

If, however, water is present on the plates instead of a rodent, either due to flooding or arising from the immediate area being washed down, such as in a commercial facility, the water will present a low resistance which can falsely indicate that a rodent is present. In the case of electronic rodent traps that operate by generating an electric shock like those in the '899 and '466 patents, it is inadvisable for the trap to trigger a high voltage killing cycle under these conditions since the low resistance of water may damage the output circuitry of the high voltage generator.

In addition, false triggers from water infiltration can be quite an annoyance for the user such as, for example, when the area containing the trap is washed down daily. This can be particularly problematic when the traps must be manually rearmed following every killing cycle, like those in the '899 patent, since a false trigger will result in the trap remaining inactive until it is serviced. And even with traps that automatically rearm, like those in the '466 patent, unnecessary activations need to be minimized to avoid wasted power usage.

Further, moisture conditions representing a level of water presence less than immersion or flooding, such as water spray on the plates, pose a problem in that such spray can create short-lived wetting followed by drying over time which may reoccur in a cycle, particularly in facilities having a regular wash down schedule. These brief wetting and drying cycles may result in inaccurate determinations of rodent presence versus water presence.

Therefore, a need exists for a wash down sensor incorporated within resistive sensing electronic rodent traps and monitoring stations that can detect and disregard false triggering due to water infiltration ranging from a dampening water spray to flood-type immersion of the trap.

SUMMARY

In view of the foregoing, the present invention is directed to an electronic rodent trap having a wash down sensor that includes a circuit configured to reduce the input impedance of the resistive sensor of the electronic trap in order to detect the reduced resistance of water. The circuit operates in conjunction with the trap's resistive sensor which may consist of at least two electrically charged plates like those in the '899 patent. The resistive sensor provides a detection signal which varies between high and low signal levels as is known in the art of digital signal processing, with the detection signal being low in the absence of a detected resistance. In addition to the voltage source and the microprocessor of the trap, to which the plates are connected, the circuit includes a high impedance load, a low impedance load, a capacitor, and a switching element.

Initially, the switching element is turned off with the trap in an active standby mode. When a resistance is sensed across the plates, referred to as a trigger event, the detection signal provided by the resistive sensor goes high. In response to the high level detection signal, the microprocessor activates a low impedance enable signal which is sent to the switching element. In response to the enable signal, the switching element closes to provide a path to ground through the low impedance load which quickly discharges the capacitor. If the sensed resistance is higher than the low impedance load, such as with a rodent, the detection signal will go back low as the voltage drop across the rodent is much higher than the voltage drop across the low impedance load.

However, in order to distinguish between water spray and rodent presence as being the cause of the detection signal going back low, the microprocessor according to a preferred embodiment of the present invention measures resistance over time. In particular the capacitor, once discharged, takes delay time Td to charge through the resistance on the plates, with the time to recharge being approximately proportional to the resistance. By way of the delay time, measured resistance values are sampled at regular time intervals, $T_{sample}$, to generate a sample set of resistance values, $y_o$-$y_n$. If a relatively linear decrease or a relatively linear increase in resistance levels is shown over the sample set $y_o$-$y_n$, the microprocessor will interpret the high level detection signal as having been caused by water spray or drying and will not initiate a killing cycle. If, on the other hand, calculation of the sensed resistance using the sample set of values $y_o$-$y_n$ shows a widely varying, non-linear variation in resistance levels, the microprocessor interprets the detection signal going back to low as indicative of a rodent and will thereafter initiate a high voltage killing cycle.

The variation in sensed resistance across the sample set of values is calculated using a variation of standard deviation. According to a preferred embodiment, the deviation is measured not against the mean of the sample set of values but against a linear fit using the start and end points of the sample set as the end points of a line. This value, Lsigma, is then compared against a threshold, the threshold being a numerical value derived experimentally using live rodents, with values above the threshold indicating a non-linear variation in resistance representing the presence of a live animal.

When measuring resistance across the plates based on the delay time $T_d$, the trap begins taking samples when a trigger event is detected, i.e., when the detection signal provided by the resistive sensor goes high. Between 5 and 10 samples are then collected at the regular time intervals, $T_{sample}$. Preferably the interval is every 100 milliseconds for a mouse and every 250 milliseconds for a rat, with the Lsigma value being computed on each block of 5 samples. If the level and linearity characteristics of the resistance detected over the 10 sample interval are not consistent with a rodent, the trap determines that no rodent is present and enters the active standby mode awaiting the next trigger event.

In an alternate scenario, the resistive sensor may be activated by the presence of a level of water across the plates that is consistent with flooding. With the plates submerged, the surrounding water has a resistance that is the same as, or lower than, the low impedance load of the wash down sensor. As a result, the voltage drop across the low impedance load is greater than the voltage drop across the water, and the detection signal remains high, indicating to the microprocessor that water is present, and not a rodent, and that a high voltage killing cycle should not be initiated.

The high impedance load is greater than the resistance of a rodent and, in the absence of any resistance across the plates, acts to pull the detection signal low. The high impedance load also provides a discharge path to protect the microprocessor from electrostatic discharges on the plates.

The present invention is also directed to a method for the operation of an electronic rodent trap that includes a resistive sensor and a wash down sensor, the method including placing the trap in an active standby mode, activating the wash down sensor in response to detection of resistance by the resistive sensor and determining whether the resistance meets a threshold level consistent with a rodent. If the resistance is too low and therefore likely due to the presence of water, the trap returns to the active standby state without initiating a high voltage killing cycle. If the resistance meets the threshold, a plurality of resistance measurements are taken over a time period as a sample set and analyzed to determine whether the level and variation characteristics of the resistance across the sample set are consistent with rodent presence before a high voltage killing cycle is initiated. Resistance level and variation characteristics consistent with a rodent are those levels above a threshold having a widely irregular variation as is produced by an animal moving on the plates.

While references have been made to electronic rodent traps and the presence of rodents, it will be understood that the instant invention may be adapted for traps, electronic and otherwise, that are used in connection with other animals. Therefore, "rodent" is intended to refer to any animal to which a particular trap may be aimed for use. In addition, the present invention is intended to include applications in which the wash down sensor is used in conjunction with monitoring systems that do not include a killing mechanism, such as bait stations where the sole or primary aim is only to detect the presence of rodents or other pests.

Accordingly, it is an object of the present invention to provide a wash down sensor for a resistive-sensing electronic trap that is configured to differentiate water infiltration from the presence of an animal to prevent false triggering of the trap.

Another object of the present invention is to provide a wash down sensor for an electronic trap in accordance with the preceding object that includes a switchable low impedance load to reduce the input impedance of the resistive sensor of the trap such that the reduced resistance of water will be detected.

A further object of the present invention is to provide a method for detecting and disregarding false triggering of resistively sensed animal traps and monitoring stations due to water infiltration ranging from a dampening but temporally brief water spray to flooding conditions.

Yet another object of the present invention is to provide a rodent trap having a resistive sensor that is able to differentiate between the low resistance of water and the higher resistance of a rodent.

Still another object of the present invention is to provide an electronic rodent trap in accordance with the preceding object in which the resistive sensor includes two or more plates, or wires, or PCB traces.

A further object of the present invention is to provide an animal trap or monitoring station equipped with a wash down sensor that includes a resistive sensor and a circuit for reducing the input impedance of the resistive sensor, the circuit including a voltage source, a capacitor, a high impedance load, a low impedance load, a switching element, and a microprocessor that monitors a detection signal from the resistive sensor and generates a low impedance enable signal when a resistance is detected by the resistive sensor to determine whether the resistance is consistent with the infiltration of water to avoid an output based on false detection of an animal.

A still further object of the present invention is to provide an animal trap or monitoring station equipped with a wash down sensor in accordance with the preceding object in which the low impedance signal discharges the capacitor which then takes delay time $T_d$ to charge through the resistance on the plates, the time to recharge being substantially proportional to the resistance, the microprocessor measuring the resistance by taking a set of samples at regular time intervals, $T_{sample}$, preferably 100 milliseconds for a mouse and 250 milliseconds for a rat, and analyzing the level and variation characteristics within the sample set to distinguish between water spray on the plates followed by drying and the presence of a rodent.

Yet a further object of the present invention is to provide a pest monitoring station having a resistive sensor that is able to differentiate between the low resistance of water and the higher resistance of a pest in order to more accurately detect when a pest is in fact present as opposed to various degrees of environmental moisture.

Another object of the present invention is to provide a rodent monitoring or killing mechanism that includes a housing body having a power source and a resistive sensor, and a wash down sensor coupled to the resistive sensor and configured to prevent false detection of a rodent when the rodent monitoring or killing mechanism is exposed to water.

Yet another object of the present invention is to provide an electronic animal trap that includes a microprocessor and a resistive sensor coupled to a high voltage killing circuit and to a wash down sensor, the resistive sensor, upon detecting a resistance, sending a detection signal to the microprocessor which in turn activates the wash down sensor to determine whether the resistance is above a threshold value consistent with the presence of a rodent and thus warranting activation of the killing circuit, or whether the resistance is below the threshold value thus indicating the presence of water such that the killing circuit is not activated and false triggering of the electronic rodent trap is prevented.

A further object of the present invention is to provide a method for the operation of an electronic rodent trap that includes a set of plates as part of a resistive sensor and a wash down sensor having a capacitor, switching element, and high and low impedance loads, in which the method includes placing the trap in an active standby mode, activating the wash down sensor in response to detection of resistance by the resistive sensor, determining whether the resistance meets a threshold level consistent with a rodent and, if the resistance is too low and therefore likely due to the presence of water, returning to the active standby state without initiating a high voltage killing cycle.

Yet a further object of the present invention is to provide a method in accordance with the preceding object in which activation of the wash down sensor discharges the capacitor and a plurality of resistance samples are measured by way of the delay time $T_d$ needed for the capacitor to recharge over the plates, a linear decrease in resistance or a linear increase in the samples taken over $T_{sample}$ intervals indicating water spray or drying, and a widely varying, non-linear variation in resistance levels over the sample set indicating the presence of a rodent.

Another object of the present invention is to provide a method in accordance with the two preceding objects in which the variation in sensed resistance is calculated using a variation of standard deviation in which the deviation is measured against a linear fit using the start and end points of the sample set as the end points of a line to obtain the value, Lsigma, which is then compared against a threshold, values above the threshold indicating non-linear variation in resistance levels consistent with the presence of a live animal.

Yet another object of the present invention is to provide a method in accordance with the three preceding objects in which the trap begins sampling the resistance across the plates when a trigger event is detected and collects between 5 and 10 samples at Tsample regular intervals, preferably every 100 milliseconds for a mouse and every 250 milliseconds for a rat, with the Lsigma value being computed on each block of 5 samples, the level and linearity of the resistance across the sample blocks being used to determine whether or not a rodent is present.

Still another object of the present invention is to provide a device and method in accordance with at least one of the preceding objects in which the electronic trap or monitoring station is economical to manufacture, and reliable and robust in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 8 is a graph of samples taken over time according to the graph shown in FIG. 7 with sample points Y identified to compute the Lsigma value with the delta being equal to $Y_n$-$Y_o$;

FIG. 9 is an equation for the Lsigma value using the delta of FIG. 8;

FIG. 10 is a diagram of the detection signal of the circuit shown in FIG. 4 going high and staying high when immersing levels of water are present.

DETAILED DESCRIPTION OF THE EMBODIMENTS

Figure 1:
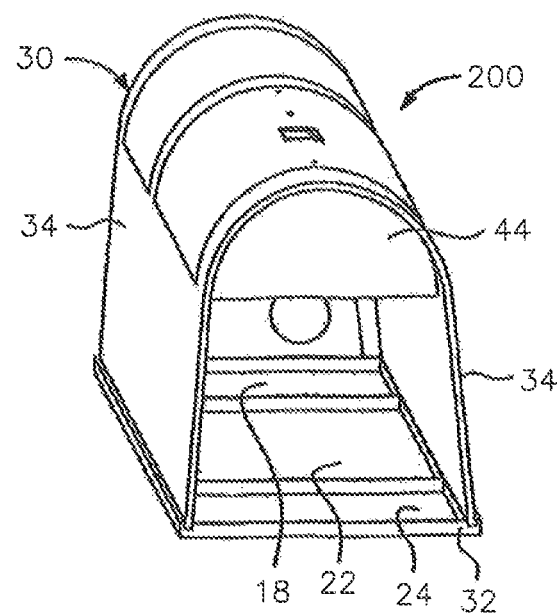
FIG. 1 shows a known electronic rodent trap having a three killing plate configuration.

It is to be understood that the embodiments described herein are disclosed by way of illustration only. It is not intended that the invention be limited in its scope to the details of construction and arrangement of components set forth in the following description or illustrated in the drawings. Also, in describing at least one preferred embodiment, specific terminology will be resorted to for the sake of clarity. It is to be understood that each specific term includes all technical equivalents which operate in a similar manner to accomplish a similar purpose.

Figure 2:
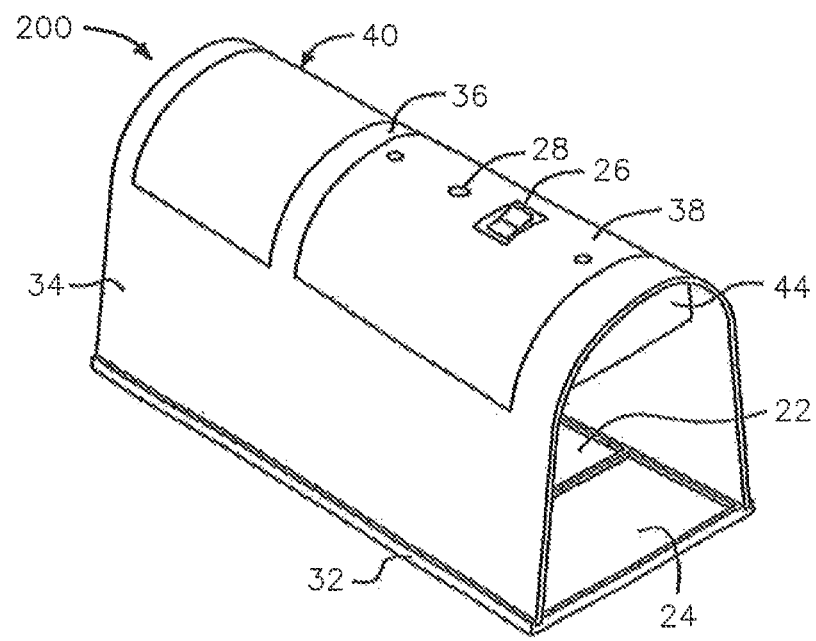
FIG. 2 is another view of the electronic rodent trap shown in FIG. 1.
Figure 3:
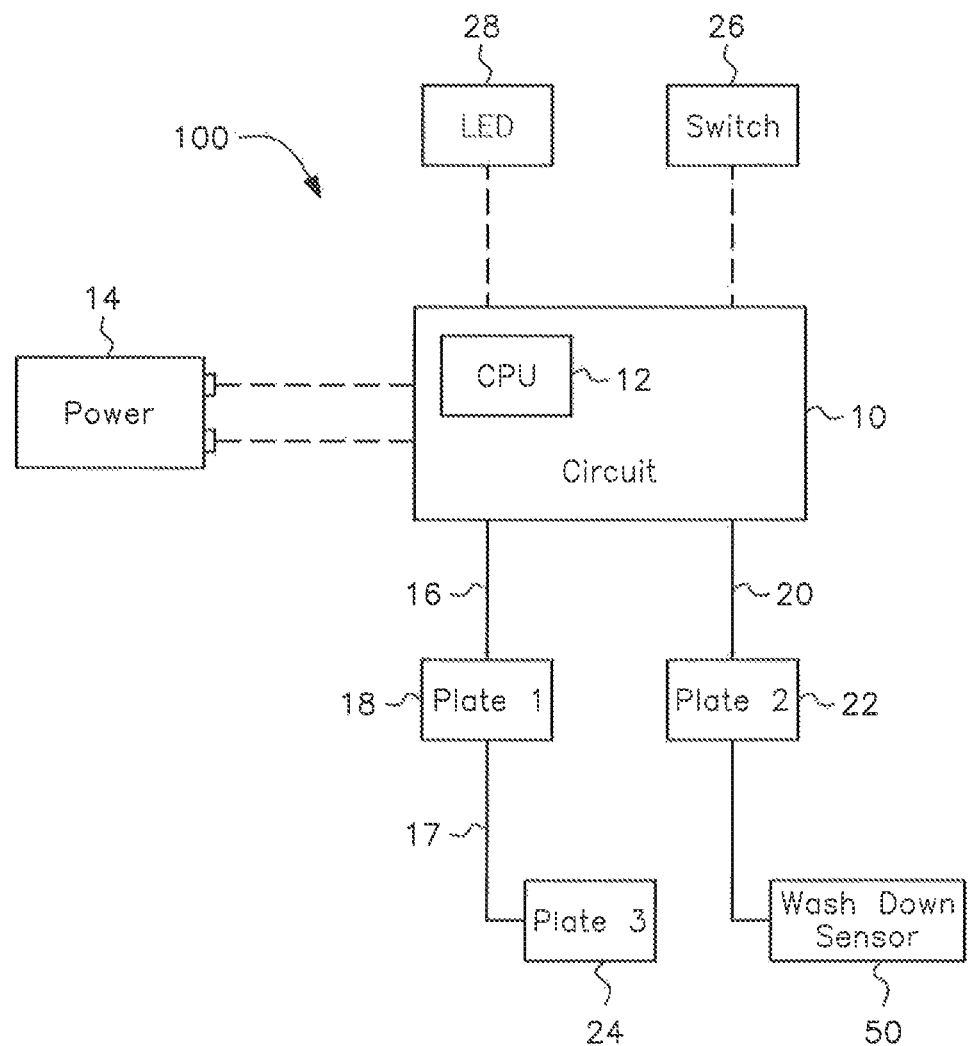
FIG. 3 is a block diagram of an electronic rodent trap having a wash down sensor for detecting and disregarding false triggering of the electronic rodent trap due to water infiltration in accordance with the present invention.

An electronic rodent trap from the '466 patent and generally designated by reference numeral 200 is shown in FIGS. 1 and 2. While FIGS. 1 and 2 do not show the wash down sensor, the trap 200 is suitable to be configured with a wash down sensor 50 in accordance with the present invention as generally depicted in FIG. 3. Similar, traps having only two plates like those shown in the '899 patent may also be configured with a wash down sensor.

The trap 200 includes a housing 30 having a bottom wall 32, upstanding side walls 34, an overhang 44 (optional) and a roof 36 provided with an electronics chamber 38 and a battery cover 40. The upper surface of the electronics chamber 38 carries a switch 26 or button that toggles from an "on" or standby position, in which the electronic components of the trap may be activated, to an "off" or reset position, and also includes an LED 28 which provides visual indications of the activity and status of the trap. The battery cover 40 covers an area which contains a power supply 14 (see FIG. 3).

The power supply 14 which provides power to the trap can include one or more batteries, such as two AA batteries. Alternatively, the trap may be electrically connected to a wall outlet or otherwise electrically powered. When embodied as a battery, the power supply 14 may be conveniently located in the power supply area under the battery cover 40. The battery cover 40 is preferably snap fitted for easy entry to replace expired batteries.

The electronic rodent trap 200 may be configured with rearming circuit components, generally designated by reference numeral 100, as shown in FIG. 3. The circuit components 100 include a high-voltage output circuit 10 controlled by a central processing unit (CPU) 12 and electrically connected to a power supply 14. The CPU 12 may be embodied as a standard 8-bit micro controller chip, and the high output circuit 10 can be a standard fly-back circuit.

A first electrical connection member 16, which may be embodied as a wire, receives current from the high-voltage output circuit 10 and also connects to a first killing plate 18 so that electricity can be provided thereto. A second electrical connection member 20, which may also be a wire, connects the high-voltage output circuit 10 to a second killing plate 22. A wash down sensor 50 is coupled to the second killing plate 22.

The first and second killing plates 18, 22 are the active plates which trigger activation of the circuit. In the embodiment shown, a third killing plate 24 is coupled to the first plate 18 by a third electrical connection member 17 and automatically goes to the voltage level of the first plate 18 when the circuit is activated. However, the wash down sensor does not require the presence of a third plate for effective operation. The circuit is turned on to an enabled state by the switch 26.

Figure 4:
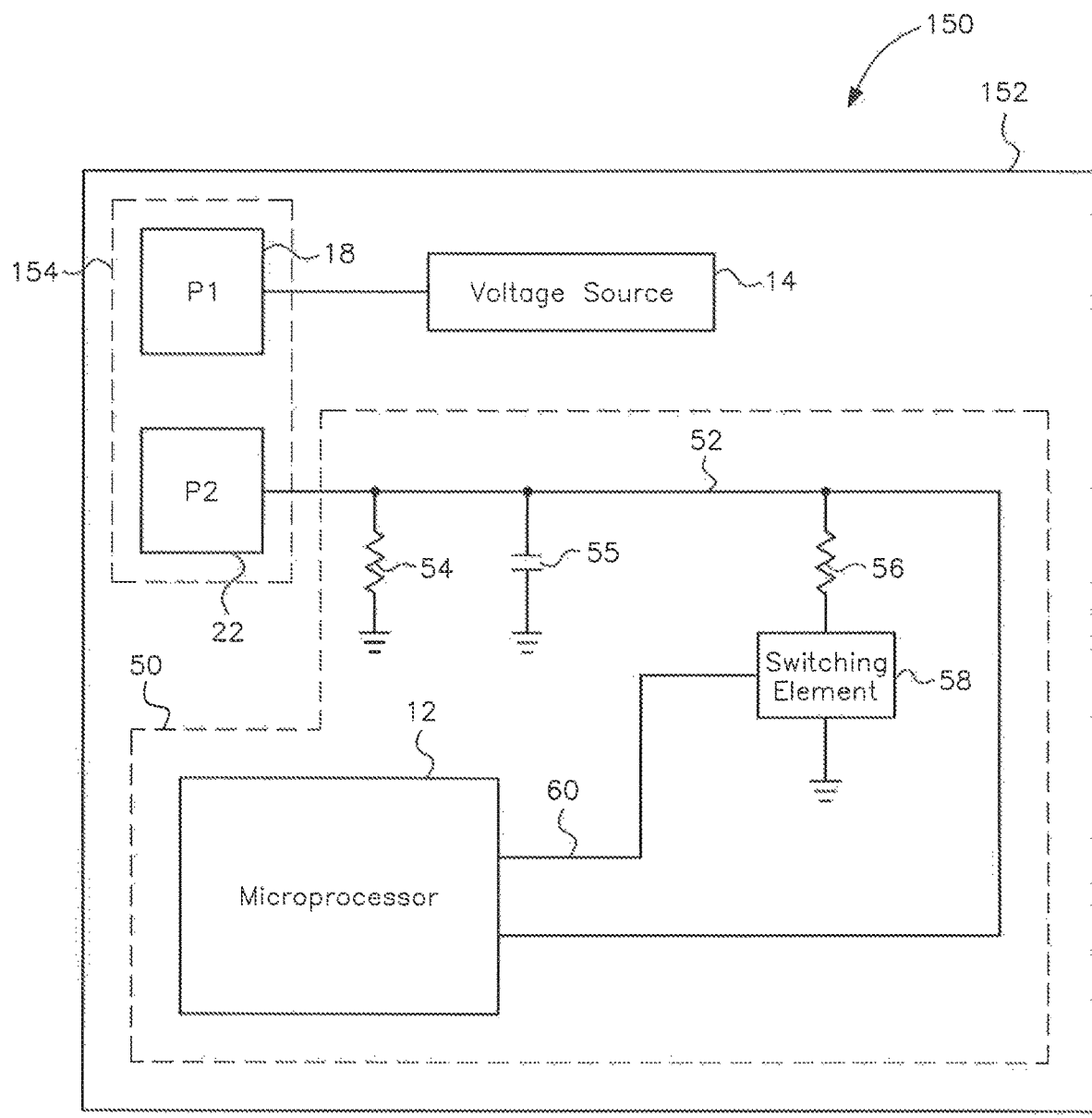
FIG. 4 is a block diagram of a circuit for the wash down sensor within a rodent monitoring or killing mechanism in accordance with the present invention.

While a trap like that disclosed in the '466 patent is shown, this is understood to be representative only. The wash down sensor 50 in accordance with the present invention may be incorporated within any number of electronic trap designs or monitoring stations as would be understood by persons of skill in the art and is not intended to be limited to a trap having three killing plates. Rather, the resistive sensor may be any number of plates, wires, PCB traces and the like. The wash down sensor may also be incorporated within traps that do not include high voltage killing mechanisms as well as within monitoring stations that do not include any type of killing mechanism but which are configured only to detect pest presence. Thus, as shown in FIG. 4, the present invention is directed to a rodent monitoring or killing mechanism generally designated by reference numeral 150. The rodent monitoring or killing mechanism 150 includes a housing 152 having a voltage source 14, a resistive sensor 154, and a wash down sensor 50. The wash down sensor 50 is coupled to the resistive sensor 154 and configured to prevent false detection of a rodent when the rodent monitoring or killing mechanism 150 is exposed to water.

The circuit for the wash down sensor 50 is shown in FIG. 4. The circuit operates in conjunction with the resistive sensor 154 of the rodent monitoring or killing mechanism which, in the embodiment for an electronic rodent trap as shown in FIG. 4, includes the first and second plates 18, 22. While not shown in FIG. 4, a third plate 20 may also be present but does not change the operation of the wash down sensor as described herein.

The resistive sensor 154 provides a detection signal 52 which varies between high and low signal levels, with the detection signal being low in the absence of a detected resistance. In the embodiment shown in FIG. 4, the circuit preferably also uses the same voltage source 14 and microprocessor 12, to which the plates are connected, already resident in the electronics of the trap. Alternatively, a separate microprocessor could be employed but this is not preferred.

The circuit of the wash down sensor 50 includes a high impedance load 54, a low impedance load 56, a capacitor 55 and a switching element 58. The high impedance load 54 may be an additional resistor in the circuit as shown in FIG. 4 or may be represented by the intrinsic impedance of the microprocessor itself. The switching element 58 may be embodied with a MOSFET, bipolar transistor or the like. The low impedance load 56 may be an implicit resistor and is coupled to ground through the switching element as shown. Alternatively, the low impedance load may be embodied as an internal pull-down resistor incorporated directly into the microprocessor pin, in which case the switching element could be within the microprocessor itself.

When a resistance is sensed across the plates, the detection signal 52 goes from low to high. In response, the microprocessor 12 activates a low impedance enable signal 60 which is sent to the switching element 58, causing the switching element to close and provide a path to ground through the low impedance load 56 which quickly discharges the capacitor 55. If the sensed resistance is higher than the low impedance load, such as with a rodent, the detection signal will go back low as the voltage drop across the rodent is much higher than the voltage drop across the low impedance load.

Figure 5:
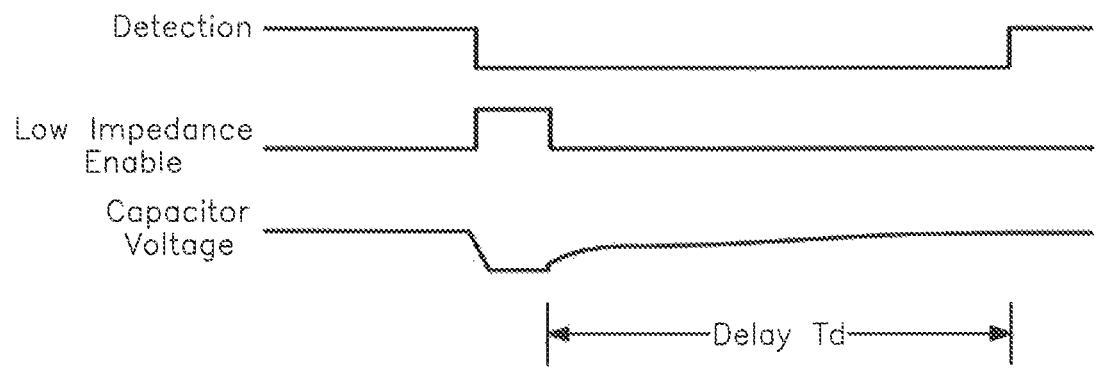
FIG. 5 is a diagram of the detection signal of the circuit shown in FIG. 4 going high to activate the low impedance enable signal and initiating measurement of resistance based on the delay time Td to determine rodent presence or water spray.

Thus, when resistance is sensed in operation, activation of the resistive sensor by a rodent will cause the detection signal to go high and then, following activation of the wash down sensor, the detection signal will go back low as shown in FIG. 5 because the rodent has a higher resistance than the low impedance load 56 and the voltage drop across the low impedance load is lower than the voltage drop across the rodent.

Figure 5A:
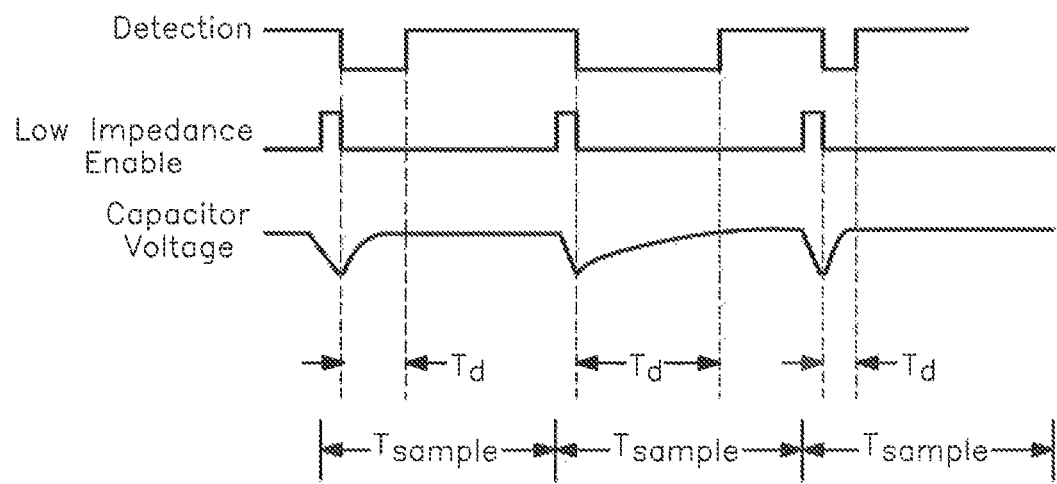
FIG. 5A is a diagram like that shown in FIG. 5 and showing resistance measurements taken as sample sets at regular time intervals, $T_{sample}$.
Figure 6:
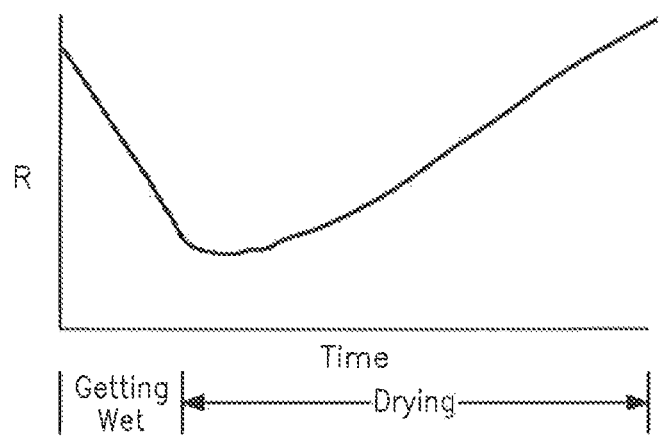
FIG. 6 is a graph of measured resistance over time according to the diagram in FIG. 5 when in a water spray and drying scenario.

However, in order to distinguish between water spray and rodent presence as being the cause of the detection signal going back low, the microprocessor according to a preferred embodiment of the present invention measures resistance over time as shown in FIG. 5A. In particular the capacitor, once discharged, takes delay time $T_d$ to charge through the resistance on the plates, with the time to recharge being approximately proportional to the resistance. If the sensed resistance as measured taking a sample set of values at regular time intervals, $T_{sample}$, shows a relatively linear decrease or a relatively linear increase over the sample set of resistance measurements $Y_o$-$Y_n$ as shown in FIG. 6, the microprocessor will interpret the high level detection signal as having been caused by water spray followed by drying and will not initiate a killing cycle.

Figure 7:
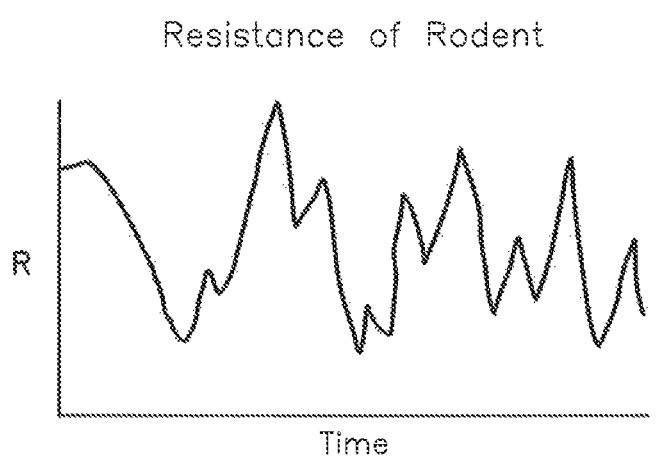
FIG. 7 is a graph of measured resistance over time according to the diagram in FIG. 5 when in a rodent-present scenario.

If, on the other hand, measurement of the sensed resistance over the sample set of values shows a widely varying, non-linear variation in resistance levels as shown in FIG. 7, such wide variation is consistent with the movements of a rodent on the plates. Specifically, as the animal moves around, more or less skin surface contacts the plates, which results in a widely varying, very non-linear resistance variation. In this case, the microprocessor interprets the detection signal going back to low as indicative of a rodent on the plates 18, 22. When the rodent monitoring or killing mechanism 150 is embodied as an electronic rodent trap, the trap will then initiate a high voltage killing cycle.

The variation in sensed resistance as measured across the sample set of values is calculated using a variation of standard deviation. According to a preferred embodiment, the deviation is measured not against the mean of the sample set of values but against a linear fit using the start point $Y_0$ and the end point $Y_n$ of the sample set as the end points of a line as illustrated in FIG. 8. Using the delta ($Y_n$-$Y_0$) the value, Lsigma, is calculated according to the equation shown in FIG. 9. The Lsigma value is then compared against a threshold, the threshold being a numerical value derived on the basis of the tested resistance of live rodents, with values above the threshold representing the presence of a live animal.

When measuring resistance across the plates over the sample set of resistance values $Y_o$-$Y_n$, the trap begins taking resistance measurement samples when a trigger event is detected, i.e., when the detection signal provided by the resistive sensor goes high or appropriate resistance is detected between the third plate and the voltage source. Between 5 and 10 samples are then collected at regular time intervals, Tsample, with the Lsigma value being computed on each block of 5 samples. According to a preferred embodiment, the interval is every 100 milliseconds for a mouse and every 250 milliseconds for a rat. If the level and linearity of the resistance measurements taken over the 10 sample interval are not consistent with a rodent, the trap determines that no rodent is present and enters the active standby mode awaiting the next trigger event.

FIG. 10 illustrates the signal response that occurs when the resistive sensor is activated by the presence of an immersing level of water across the plates. Submersion of the plates causes the detection signal to go high and to remain high after the wash down sensor is activated because the water has a resistance that is the same as, or lower than, the low impedance load of the wash down sensor such that the voltage drop across the water is lower than the voltage drop across the low impedance load. The detection signal remaining high indicates to the microprocessor that water is present, and not a rodent, and that a high voltage killing cycle should not be initiated.

The present invention is also directed to a method of operation for a rodent trap or monitoring station having a resistive sensor and a wash down sensor that includes a circuit configured to determine whether a sensed resistance is consistent with a rodent or is due to the presence of water.

Figure 11:
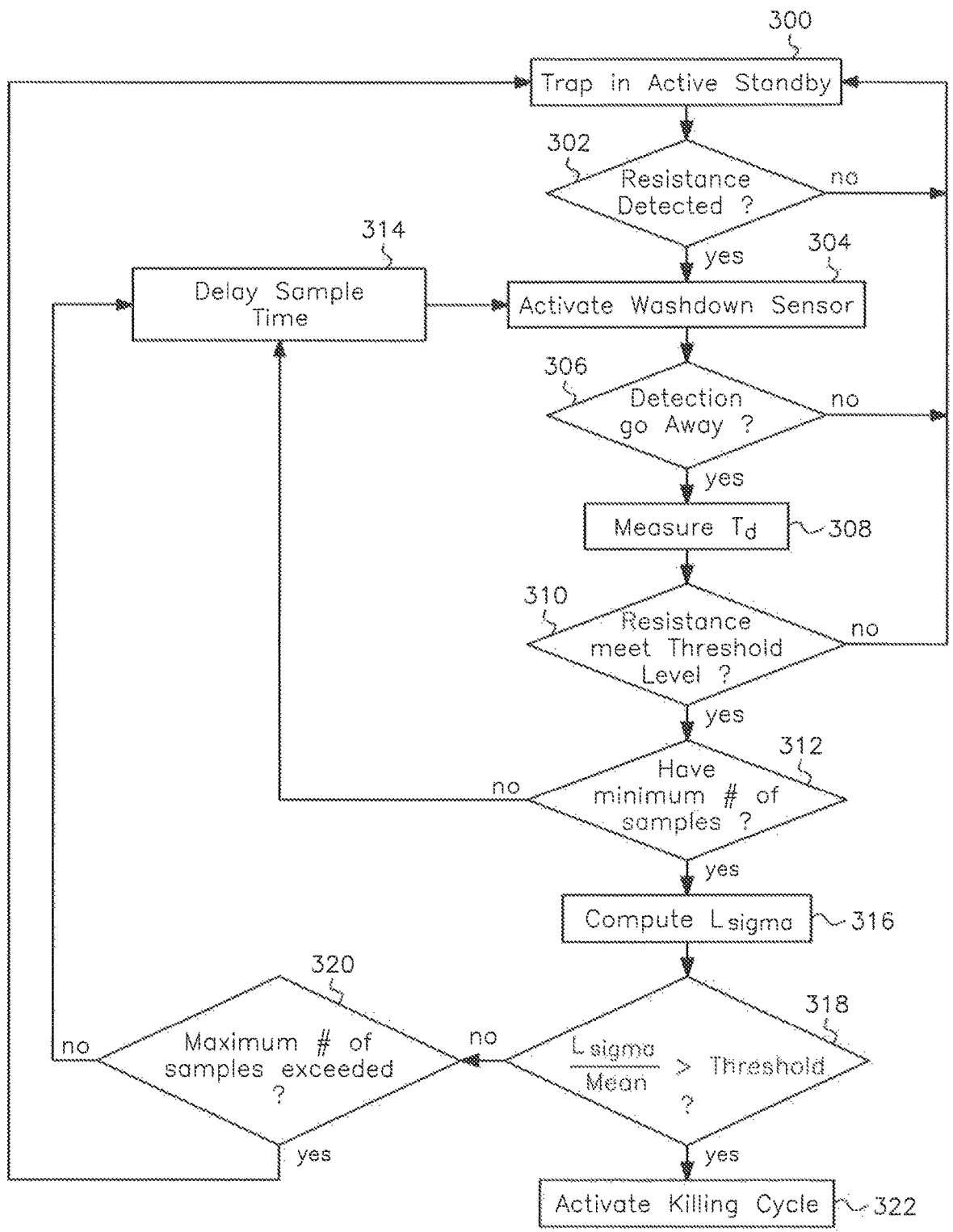
FIG. 11 is a flow chart of a method of detecting resistance and preventing false triggering due to the presence of water in an electronic rodent trap that is provided with a wash down sensor in accordance with the present invention.

As summarized in FIG. 11 in connection with an electronic rodent trap such as that described in the '466 patent and representatively shown in FIGS. 1 and 2, the method includes placing the trap in an active standby mode, step 300. If resistance is detected by the resistive sensor, step 302, the wash down sensor is activated, step 304. The trap then determines, with the wash down sensor enabled, whether the detection signal has gone back low, step 306. If not, the trap is determined to be flooded and returns to the active standby mode, step 300, without initiating a killing cycle.

If the detection signal has gone back low, step 306, the trap measures the delay time $T_d$, step 308, to determine if the resistance meets a threshold level consistent with a rodent, step 310. If the resistance is below the threshold, the trap returns to the active standby state, step 300, without initiating a high voltage killing cycle. If, however, the resistance meets a threshold level consistent with a rodent, step 310, the trap determines whether a minimum number of samples have been collected, step 312, in order to most accurately distinguish between the presence of a rodent and possible water spray on the plates followed by drying. If the minimum number of samples have not been collected, step 312, the trap collects additional samples, step 314, until the minimum number of samples has been collected while the detection signal continues to remain low and the resistance continues to meet the threshold level, step 310.

Once the minimum number of samples is obtained, step 312, the trap computes Lsigma, step 316, and determines whether Lsigma divided by the mean of the samples is greater than a threshold, step 318. If not, and if the maximum number of samples has been exceeded, step 320, the trap returns to the active standby mode, step 300. If Lsigma divided by the mean of the samples is not greater than the threshold, step 318, and the maximum number of samples has not been exceeded, step 320, the trap collects additional samples, step 314, and continues to analyze the detection signal and resistance levels.

Finally, if Lsigma divided by the mean of the samples is greater than the threshold, step 318, the trap determines that the samples indicated a non-linear variation in resistance that demonstrates a rodent is present and activates a killing cycle, step 322. After the killing cycle, the trap may undergo steps to rearm as is disclosed in the '466 patent, await servicing, or take other action as may be appropriate for the particular trap configuration within which the wash down sensor according to the present invention is implemented.

The method is further intended to be employed with any kind of rodent monitoring and/or killing mechanism that includes a resistive sensor and a wash down sensor as has been described herein.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A rodent monitoring or killing mechanism comprising:
   a housing body having a resistive sensor; and
   a wash down sensor operatively coupled to the resistive sensor and adapted to distinguish between the presence of water within the housing body and the presence of a rodent according to at least one measurement of resistance from the resistive sensor, the at least one measurement of resistance created by contact of the resistive sensor with the water or the rodent.

2. The rodent monitoring or killing mechanism of claim 1, wherein the mechanism is an electronic rodent trap that includes a high voltage killing circuit coupled to the resistive sensor.

3. The rodent monitoring or killing mechanism of claim 2, wherein the high voltage killing circuit activates in response to detection of a resistance consistent with a rodent being in contact with the resistive sensor.

4. The rodent monitoring or killing mechanism of claim 3, wherein the resistive sensor includes at least two conductors that receive a high voltage pulse train when the high voltage killing circuit is activated.

5. The rodent monitoring or killing mechanism of claim 1, wherein the resistive sensor includes a pair of plates.

6. The rodent monitoring or killing mechanism of claim 1, wherein the wash down sensor includes a processor responsive to the output of the resistive sensor for determining the presence of water or a rodent in the trap according to a measured change in an output of the resistive sensor.

7. The rodent monitoring or killing mechanism of claim 6, wherein the wash down sensor includes a switching mechanism coupled to the processor.

8. The rodent monitoring or killing mechanism of claim 7, wherein the switching mechanism is activated upon detection of a resistance across a pair of plates of the resistive sensor.

9. The rodent monitoring or killing mechanism of claim 8, wherein the wash down sensor includes a high impedance load coupled between an output of the resistive sensor and a ground reference.

10. The rodent monitoring or killing mechanism of claim 9, wherein the wash down sensor includes a low impedance load coupled between the output of the resistive sensor and the switching mechanism.

11. The rodent monitoring or killing mechanism of claim 10, wherein the wash down sensor includes a capacitor coupled between the output of the resistive sensor and the ground reference.

12. The rodent monitoring or killing mechanism of claim 11, wherein the processor is operatively coupled to an output of the switching mechanism and the output of the resistive sensor.

13. The rodent monitoring or killing mechanism of claim 11, wherein the switching mechanism closes a path to ground through the low impedance load and discharges the capacitor when the switching mechanism is activated.

14. The rodent monitoring or killing mechanism of claim 1, wherein the wash down sensor takes a plurality of resistance measurements as a sample set.

15. The rodent monitoring or killing mechanism of claim 1, wherein the resistive sensor includes a first conductive element and a second conductive element electrically isolated from the first conductive element.

16. The rodent monitoring or killing mechanism of claim 15, wherein the housing body has a power source.

17. The rodent monitoring or killing mechanism of claim 16, wherein the power source is operatively coupled to the first conductive element and the wash down sensor is operatively coupled to the second conductive element.

18. The rodent monitoring or killing mechanism of claim 1, wherein the wash down sensor takes a plurality of resistance measurements as a sample set over regular time intervals, $T_{samples}$, variation in the resistance measurements across the sample set being used by a processor of the rodent monitoring or killing mechanism to distinguish between a water and rodent presence.

19. The rodent monitoring or killing mechanism of claim 18, wherein the variation in the resistance measurements across the sample set is one of: relatively linear; or widely varying and non-linear, with the relatively linear sample set being associated with water contact, and the widely varying and non-linear sample set being associated with the movement of a rodent on the resistive sensor.

* * * * *